Dec. 4, 1945.  W. C. WRIGHT  2,390,485
SHOE AND WELT THEREFOR
Filed Oct. 5, 1943
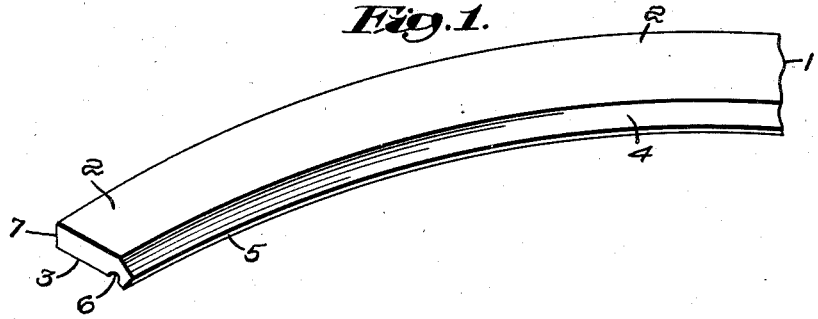
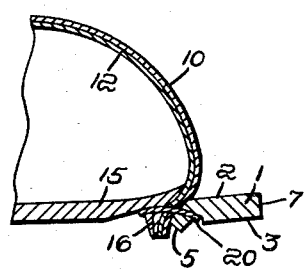
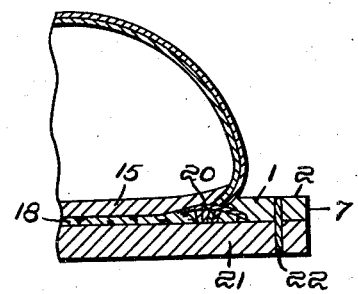
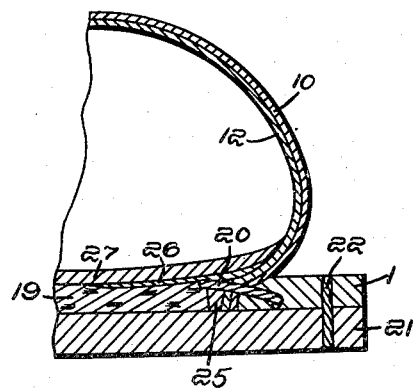
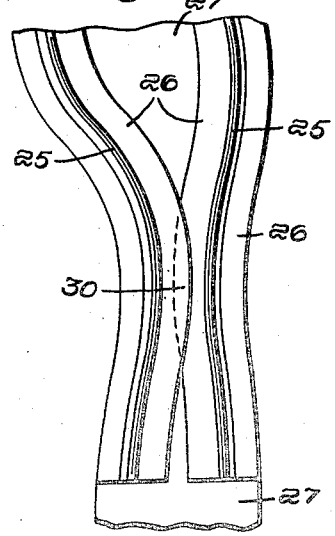
Inventor:
Wallace C. Wright
by James R. Hodder
Attorney Patented Dec. 4, 1945

2,390,485

UNITED STATES PATENT OFFICE 2,390,485

SHOE AND WELT THEREFOR

Wallace C. Wright, Brookfield, N. H., assignor to Wright-Batchelder Corporation, Boston, Mass., a corporation of Massachusetts Application October 5, 1943, Serial No. 505,005

4 Claims. (Cl. 36—17)

My present invention is a novel type of welt for use in shoe-making, and a novel shoe structure made thereby.

Heretofore, in the manufacture of welt shoes, it has been customary to utilize short strips of leather, bevelled or scarfed and united at each end and skived to a fairly uniform width, which welts were attached to the upper and insole of a shoe by so-called inseam stitching. Thus, such welts of the prior art were made up of varying degrees of strength, density, porosity, and stitch-retaining capacity, which features varied with each short strip incorporated in the welt strip by scarfing and cementing the end portions together.

A further difficulty was presented in the stitching operations thru the scarfed end portions of adjacent leather pieces in the welt strip.

Such prior leather welts also had to be made from expensive leather in order to retain both the inseam stitching and outsole stitching, which were set thru the welt in close proximity, and such welt strips were necessarily thin and narrow. Various efforts have heretofore been made to strengthen and build up welt strips suitable for shoe manufacture of textile and other materials but without success.

It is an object of my present invention to improve the welt structure and consequently to improve the welt shoe made therewith and to render the entire shoe structure more durable, more weather proof, and more flexible and better fitting than has heretofore been possible with the standard type of welts in use.

In carrying out this invention I have discovered that by utilizing a flexible or elastic plastic, or plasticized plastics such as various commercial plasticized vinyl resins or the like now on the market, I am enabled to produce a strong, waterproof, continuous welt strip of uniform size, dimensions, and strength throughout, and by inexpensive processes. Furthermore, my improved welt from this material insures more uniform tension to both the inseam stitching and the outsole stitching, which are set thru the welt, thus enabling a firmer, tighter, as well as a smoother shoe structure.

Also, I find that suitable synthetic plastics for carrying out the present invention may be made of several types of polymerized vinyl chloride, or the like, polymerized with one or more well known substances.

In my experimentations with modern synthetic plastics for welts and insole sewing ribs, I have successfully utilized plastics made by the B. F. Goodrich Company under the name of Koroseal, and also Vinylite made by the United Carbon & Carbide Company.

A still further advantage in utilizing such plastic material for shoe welt consists in the fact that I am enabled to pre-curve or pre-form such plastic welt material either widthwise and/or lengthwise, or both if desired. Thus, the welt will more naturally lay or conform to the contour of the shoe not only around the toe portion and shank but also widthwise of the welt so that the outer edge of the welt will normally tend to keep in snug contact with the corresponding edge portion of the outsole when stitched together.

This pre-forming or pre-curving is most important in enabling a better fitting shoe to result, both where the welt is fitted against the upper materials and insole and held by the inseaming operation, as well as where the welt edge is in contact with the outsole. These features are a distinct novelty and important in this art, and I wish to claim the same broadly herein.

A still further feature of considerable importance is the waterproofness of my improved structure. In welt shoe construction, moisture is apt to follow thru the stitches, particularly the inseam stitching, and thus work in from the outside to the inside of the shoe, with resultant damage. In my use of a water-proof plasticized vinyl resin material as a welt, and particularly also where I may employ a similar plastic sewing-ribbed insole, as shown and claimed in my prior application Ser. No. 348,387, filed July 30, 1940, I insure the waterproofness of my improved shoe structure, since such plastic sewing rib on the insole and welt grip the inseam stitching tightly and prevent water following therethru. This is a distinct and important advantage over the leather welt or insole with a sewing rib of leather or textile material, or both.

Another advantage incident to the use of my improved welt structure is the rigidity afforded by the plasticized vinyl resin, or the like, during the sewing operation, enabling the operator to attain greatly increased speed and confidence during both the inseaming and outsole-stitching operations.

The firm, stitch-retaining, and uniform structure in my improved welt and particularly in the pre-formed welt of my present invention is most advantageous during the shoe-making operations, as above noted, as well as the subsequent edge-trimming and finishing operations, both outsole and welt edge being simultaneously cut or trimmed, inked, burnished, and finished without the many disadvantages incident to a leather welt made up of various short strips of differing grades of material, and with weak points at the scarfed edge portions.

My improved welt structure can be made in extremely long lengths of absolutely uniform dimensions and with a predetermined pre-formation which tends to improve the shoe structure, as above briefly noted. In fact, my improved welt presents an ideal combination with a flexibility of the shoe upper, insole, and outsole retained, and the relative hardness, rigidity, weather-proofness and yet elasticity afforded by the plasticized vinyl resin, or the like, material, giving strength, rigidity, stitch-retaining, and attractive finish in the welt surface. Furthermore, my welt material can be made of any color to match or contrast with the rest of the shoe structure, which coloring is preferably permeated throughout the welt and is, therefore, permanent and unvarying.

Referring to the drawing illustrating preferred embodiments:

Fig. 1 is a perspective view of a typical preformed welt structure embodying my invention;

Fig. 2 is a cross-sectional fragmentary view illustrating the inseam structure on a welt shoe with a standard insole and sewing rib;

Fig. 3 illustrates the shoe of Fig. 2 with an outsole added;

Fig. 4 is a view on an enlarged scale illustrating the widthwise pre-forming contour somewhat exaggerated;

Fig. 5 is a fragmentary cross-sectional view illustrating my novel welt and shoe incorporating a sewing rib of similar plastic material and form of my said prior application Ser. No. 348,387; and Fig. 6 is a fragmentary plan view illustrating the shoe structure of Fig. 5, wherein the attaching flange and sewing rib is of sufficient width to overlap at the shank of the shoe and thus save the necessity of gemming the insole.

Referring to the drawing, my improved welt of elastic or flexible plasticized material, such as vinyl resin, of appropriate dimensions for the size and weight of shoe with which it is to be incorporated as a welt, may be made by an extruding process in continuous strips, and comprises a smooth top surface 2, bottom surface 3, inner bevelled part 4, and inner edge 5, and is formed in this construction together with a stitch-retaining groove 6.

The outer edge 7 is adapted to be trimmed with the corresponding trimming portion on the edge of the outsole after the latter has been attached thereto.

My plastic welt may be formed as a straight strip with straight side edges, but preferably is formed with a longitudinal curve with the inner edge 5 and bevelled face 4 on a curve of slightly less radius than that of the outer edge 7 to facilitate conformation of the welt around the toe portion of the shoe with which it is incorporated.

In the forms shown in Figs. 1, 2, and 3, I also prefer to give a widthwise pre-formation for better and snugger fitting against the insole and upper during the inseaming, as well as against the outsole during the outsole attaching process.

It will be noted, particularly in Fig. 2, how the inner portion of the welt is thus made to fit snugly against the upper materials comprising the upper 10 and lining 12 where the same is lasted on the edge of the insole 15 and stitched to a sewing rib 16, being of the usual type as illustrated in Figs. 2 and 3. Thus, the welt is drawn snugly by the inseam stitching 20; and the pre-forming widthwise of the welt 1 enables the outer edge to be more easily stitched to an outsole 21 by the outsole stitching 22, the usual filling 18 being also shown.

As illustrated in Fig. 4, it may be desirable to curve the welt widthwise, which also tends to close the groove 6 after the inseam stitching 20 is applied and the outsole secured, thereby more effectually protecting the stitching, and, because of the inherent elastic property of my plastic welt, the same produces a more waterproof construction.

In Figs. 5 and 6 I have illustrated the utilization of my improved type of unitary rib and flange construction, wherein the sewing rib 25 and attaching flange 26 are employed on the insole 27, as illustrated.

The advantages of this insole and rib construction are set forth and claimed in my said prior application. A suitable filler 19 is also illustrated in Fig. 5. In Fig. 6 I have shown the advantages of a particular flange 26 where my unitary rib and flange are employed, illustrating how the flange portions 26 may be of considerable width and overlap, as shown at 30, particularly at the shank for greater strength and to save gemming, if desired.

My complete shoe with the plastic welt and a unitary sewing rib and attaching flange still further add to the waterproofness of the shoe structure, both the welt and sewing rib automatically gripping the inseam stitching 20 and effectually preventing liquid from following thru the stitching, which is an important advantage in the invention, as will be appreciated. While I have successfully utilized Koroseal and Vinylite, as above noted, which I understand are plasticized polymerized vinyl resins, I contemplate utilizing any synthetic plastic having the characteristics of these materials, and whether polymerized, copolymerized, and plasticized or not, as long as they have the qualities and characteristics necessary for shoe welts and ribs.

I claim:

1. As an improved article of manufacture, a welt comprising a continuous strip of uniform texture, strength, dimension, and stitch-holding qualities independent of scarfing, splices, or the like, composed of plasticized, polymerized, vinyl chloride material having characteristics equivalent to Koroseal or Vinylite.

2. An improved boot or shoe structure consisting in shoe upper material, an outsole, and a welt formed of waterproof plasticized vinyl resin, or the like material, secured to said upper and said outsole, said material having characteristics equivalent to Koroseal or Vinylite.

3. A Goodyear welt shoe having a single welt to which the outsole is stitched and which serves to hold the outsole in place, said welt consisting essentially of plasticized, highly polymerized vinyl chloride of uniform texture and color throughout.

4. As a new article of manufacture, a welt formed of a continuous length of stitch-retaining synthetic plastic of vinyl resin or the like material, with the inseam-attaching portion preformed to fit a lasted shoe upper, and with the outsole-attaching portion preformed to extend substantially in parallelism with the shoe bottom.

WALLACE C. WRIGHT.